Nov. 10, 1953 C. A. EVERSMAN 2,658,411
AUXILIARY FOOT ACCELERATOR DEVICE
Filed Oct. 26, 1951
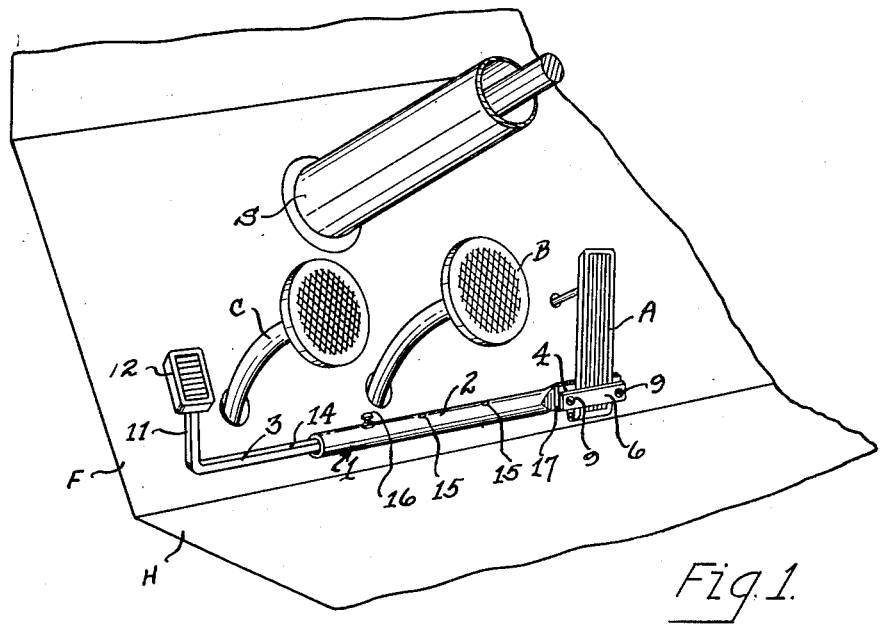
Fig. 1.
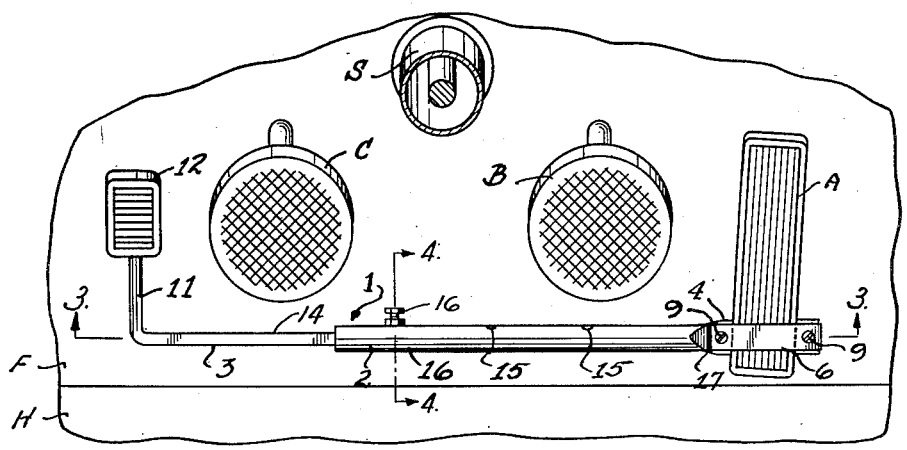
Fig. 2.
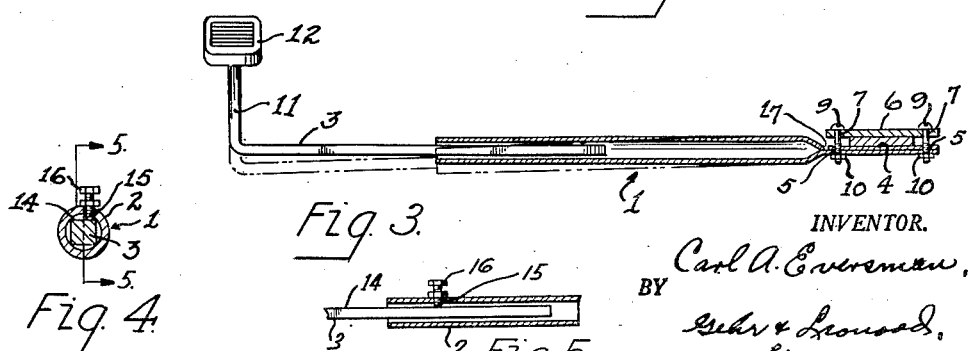
INVENTOR.
Carl A. Eversman,
BY
Gehr & Leonard,
his ATTORNEYS.

Patented Nov. 10, 1953

2,658,411

UNITED STATES PATENT OFFICE 2,658,411

AUXILIARY FOOT ACCELERATOR DEVICE

Carl A. Eversman, Lorain, Ohio

Application October 26, 1951, Serial No. 253,310

5 Claims. (Cl. 74—562.5)

1

This invention relates to an auxiliary foot accelerator device for motor vehicles by which the usual foot accelerator pedal can be caused to operate conveniently by operation of the device by the left foot.

Heretofore a number of auxiliary foot accelerator devices for the purpose described have been provided and arranged with a treadle located to the left of the clutch and operable by the left foot and connected to the conventional foot accelerator pedal so as to operate the latter in unison with the former. However, these prior devices have a number of disadvantages. For example, many are difficult to install and require changes in the existing parts of the automobile or connections to parts of the vehicle other than the foot accelerator pedal itself. Again, they are not provided with a convenient and effective means for adjusting the starting position of the auxiliary treadle. Furthermore, no conveniently operable means are provided to render the auxiliary treadle of the prior devices inoperative and to remove it entirely from its normal operating position in those instances in which such inoperativeness and removal become desirable.

The present device has a number of advantages. It can be installed easily on any conventional automobile without altering any part of the existing automobile structure. It can be detached and removed readily if no longer desired. For proper operation it is detachably connected only to the conventional foot accelerator pedal and it is so designed that it can be clamped to any of the conventional foot accelerator pedals, regardless of the width or thickness of the latter, and adjusted readily to proper position relative to the other parts of the automobile as a result of which a single size of the device is adapted for all present types of automobiles.

The device may be connected to the existing foot accelerator pedal at any desired location therealong. The treadle of the device, after the device is installed, can be adjusted easily to the desired position transversely of the automobile and adjusted forwardly and rearwardly of the automobile about its rocking axis to the most convenient angle for the particular operator. The order of these adjustments is immaterial so that a subsequent change of one does not necessitate any readjustment or change of the other. The device as a whole is arranged so that it can be adjusted to conform and operate effectively with floors of various contours.

Furthermore, without changing the setting for the angular adjustment of the treadle, the treadle may be released and moved to an inoperative position on the floor of the automobile and readily restored to adjusted operating position when desired.

The device comprises generally a rocker arm in the form of an elongated tubular member in which an elongated extension member is telescopically accommodated for movement endwise thereof and for rotation about its axis relative thereto. The extension member has a peripherally exposed shoulder on its telescopically accommodated portion, and the tubular member has a shoulder engageable by the first shoulder in one telescoped position of the members for constraining the members to rotate together in a forward direction and disengageable thereby upon relative rotation of the members in the opposite direction. The shoulder of the tubular member is positioned endwise thereof so as to be out of the path of the first shoulder when the members are moved relatively endwise to a predetermined more extended telescoped position. A clamping means is connected to one of the members at the outer end thereof and is adapted to be clamped to the foot accelerator pedal so that the arm extends transversely of the automobile floor so that the members and pedal are constrained to rock together. A treadle is carried by the other member at the outer end thereof. The device is not connected to the automobile other than by being clamped to the foot accelerator pedal. The members thus provide a composite rocking arm or member which, near the end adjacent the treadle, rests against the vehicle floor yet floats a limited amount in the plane thereof.

Other advantages and features of the present invention will become apparent from the following description of one preferred form thereof wherein reference is made to the drawings in which:

Fig. 1 is a perspective view of the present device showing the same installed in the front interior of an automobile body;

Fig. 2 is a front elevation of the device;

Fig. 3 is a longitudinal sectional view of the device and is taken on line 3—3 of Fig. 2;

Fig. 4 is a fragmentary cross sectional view of the device and is taken along line 4—4 of Fig. 3; and Fig. 5 is a fragmentary vertical sectional view taken on line 5—5 of Fig. 4, part thereof being shown in elevation.

Referring to the drawing, Fig. 1, the device is shown for purposes of illustration as installed in a conventional automobile employing the usual clutch and gear shift transmission.

As there illustrated, the automobile has the usual floor comprised of a generally horizontal portion H and forwardly upwardly sloping portion F. The automobile is provided with a steering column S to the left of which is the clutch pedal C and to the right of which is the brake pedal B. A conventional forwardly upwardly sloping foot accelerator pedal A is arranged to the right of the brake pedal B and is hingedly connected adjacent its lower end to the automobile for rocking forwardly and about an axis located near to the juncture of the portions H and F of the floor and extending transversely of the automobile.

The device may comprise an extensible rocker arm or member, indicated generally at 1, in the form of a tubular member 2 and an extension member 3 telescopically accommodated and fitted in the member 2 for movement endwise thereof and for rotation relative thereto while held in alignment thereby. One of the members forming the arm 1 is provided at its outer end portion with a suitable means for clamping its outer end portion to the foot accelerator pedal A, and the other one of the members forming the arm 1 is provided with a treadle.

In the form illustrated, the tubular member 2 is shown as provided with such a clamping means. For this purpose, an outer end portion 4 of the tubular member is crushed and flattened for an extent lengthwise greater than the maximum width of conventional foot accelerator pedals and, near the extremities of the flattened portion, is provided with bolt receiving apertures 5, respectively. A flat rigid clamping strip 6, having apertures 7 alignable with the apertures 5, respectively, is provided.

The flattened portion 4 and strip 6 are adapted to engage opposite faces of the pedal A and be held firmly in clamping engagement therewith by means of bolts 9, received through the apertures, and by nuts 10. The flattened portion 4 may be placed against the upper or lower face of the pedal A, depending on which location disposes members 2 and 3 in the best relation to the automobile floor.

When so clamped to the pedal A, the members extend generally parallel to, or at a slight angle to, the hinge axis of the pedal A. This angle can be varied so as to allow the arm 1 to rest on the floor adjacent the treadle end of the member 2. The arm preferably is clamped to the pedal A near to the hinge axis of the pedal but this is not essential for effective operation. In any event, it must be positioned lengthwise of the pedal A so as not to interfere with normal full depression of the pedal A.

To the opposite end of the arm 1 is connected a treadle 11 having a foot pad 12. In the form illustrated the extension member 3 is a length of bar stock of which one end portion is bent at right angles to the remainder and provides the treadle 11. A portion of the extension member 3, as mentioned, fits snugly in the member 2 and is rotatable therein and is slidable endwise therein for extending and contracting the arm 1.

In order to interlock the members 2 and 3 for rotation together in the direction to depress the pedal A, the relatively telescoped portion of the member 3 is provided with a peripherally exposed shoulder 14 engageable with a complementary shoulder of, and exposed within, the member 2. The shoulder 14 of the member 3 must be elongated endwise of the member 3 so as to be engageable by the shoulder of the member 2 in a plurality of relatively extended positions of the members.

For providing the necessary shoulder 14, the member 3 has formed thereon a flat outer face portion. By using bar stock of substantially square or rectangular cross section for the member 3, one lateral face of the stock itself provides a suitable shoulder 14. The complementary shoulder of the member 2 is provided by means of a pin which extends through the wall of the member 2 and is adjustable inwardly and outwardly thereof.

A simple shoulder is provided by forming in the member 2 a threaded aperture 15 and providing a pin in the form of a screw 16 in threaded engagement with the wall of the aperture 15. A lock nut is provided for securing the screw 16 in adjusted position. The inner end of the screw 16 engages the shoulder 14 for constraining the members 2 and 3 to rotate together in the direction for depressing the accelerator pedal A.

However, it is desirable that the relatively rotated positions of the members 2 and 3 be adjustable and also that the member 3 be easily releasable from the member 2 so that it can be extended or retracted to the degree desired and readily reengaged in the new lengthwise position without disturbing its circumferentially adjusted position. Again, it is desirable that the member 3 be readily disconnectable from the screw 16 so that it can be rotated forwardly to dispose the treadle 11 in an inoperative position on the floor of the automobile and replaced in operating position without interfering with the normal operation of the pedal A.

To provide for these operations and at the same time provide for a wide range of angular adjustment of the treadle 11 about the axis of the member 2, the aperture 15 is arranged with its axis extending chordally, in offset relation to the axis of the member 2 instead of radially, or diametrally, of the member 2, as best illustrated in Fig. 4.

To afford the greatest latitude in endwise adjustment of the members 2 and 3, a plurality of such apertures 15 are arranged in a row in spaced relation to each other endwise of the member 2. If further circumferential adjustment is desired an additional number of such apertures, spaced circumferentially of the member 2 from the row described, may be provided.

The screw 16 preferably has an inner end area which is relatively small so that full advantage can be taken of the chordal disposition of the screw in providing a much wider range of adjustment than would be obtainable were the screw disposed radially, or were it provided with a large inner end area. Furthermore, the inner end of the screw, if small, tends to bite into the metal of the member 3 to a small degree thus retaining the member 3 in the proper telescoped position and requiring that it be positively rotated opposite to the accelerating direction a slight amount to release it from the screw for movement to a new extended or contracted position or to an inoperative position.

It is apparent that when the attachment is secured to the pedal A and the angular position of the treadle 11 adjusted, the position of the treadle 11 transversely of the vehicle can easily be adjusted without changing the angular adjustment. Likewise, if the treadle 11 is to be moved to inoperative position, it is necessary merely to rotate the member 3 slightly rearwardly, extend the member 3 until its inner end is to the left of the screw 16, and then swing the treadle downwardly against the floor of the automobile.

When properly installed, the left end of the member 2, or of the member 3 if the latter is considerably extended, preferably rests lightly against the floor, either at or near the juncture of the floor portions H and F, so that those thrusts applied to the treadle 11 for accelerating and which would tend to rock the pedal A transversely of its hinge axis are resisted by direct counterthrusts of the floor. The end of the member 2 nearest the treadle is free to move slightly toward and away from the floor as well as to float slightly in the plane of the floor. This relieves both the device and the pedal A from undue twisting and other stresses while eliminating the necessity of any fittings connecting the device to the body other than through the medium of the pedal A. If the arm 1 is to be arranged so that the left end of either the member 2 or 3 will engage the floor at the juncture of the portions H and F, it must extend at a slight angle to the hinge axis of the pedal A.

In some automobiles the floor has a raised or humped portion at its transverse midportion so that the arm cannot extend in a straight line from its point of connection to the pedal A to its opposite end. To make possible the effective installation of the attachment under such conditions of use, the arm is so made that its end portions can be arranged with their axes angularly disposed to each other.

A simple and effective means for accomplishing this adjustment is by providing in the member 2 substantially at the left end of the flattened portion 4 a portion which is weaker than the portions adjacent to it so that the member 2 can be bent readily at the weaker portion. In the form illustrated, this is accomplished by forming in the member 2, at the portion to be made weaker, a relatively deep kerf or notch 17. This kerf preferably is in the left end of the flattened portion 4 and extends entirely through one thickness of the metal. The member 2 can be bent at the kerf so as to engage the floor properly before it is connected to the pedal A.

Thus the attachment is adaptable to all makes of automobiles, provides a wide range and variety of adjustments to make it conform to the desires of the user, is readily installable without extraneous fittings or changes in the existing automobile structure, and can operate the existing accelerator pedal smoothly without subjecting it to undue or unintended stresses.

Having thus described a preferred embodiment of my invention, it is to be understood that the same is not to be considered as limited to the illustrative structure but that modifications may be made in the various parts and arrangements thereof without departing from the scope of the invention.

Having thus described my invention, I claim:

1. An auxiliary foot accelerator for the purposes described and comprising an elongated tubular member having its axial passage circular in cross section, an elongated extension member having a portion telescopically accommodated in said passage for free movement endwise thereof in opposite directions and for rotation about the axis of the passage relative to the tubular member and having a portion extending outwardly endwise of the passage beyond one end of the tubular member, said extension member having on its telescopically accommodated portion a shoulder which extends chordally of the passage and is elongated endwise of the extension member, said tubular member having a threaded opening which extends through the wall of the tubular member, a screw in threaded engagement with the threads of the opening and having its inner end in the passage and engageable by said shoulder in predetermined telescoped positions of the members for constraining the members to rotate together in one direction about the axis of the tubular member and disengageable from said shoulder by relative rotation of the members in the opposite direction, said screw being positioned endwise of said tubular member so that its inner end is out of the path of the shoulder when the members are moved relatively endwise from said predetermined telescoped positions to more extended telescoped positions, a clamping means connected to, and at the outer end of, one of the members and adapted to be clamped to a hinge support foot accelerator pedal near the hinge axis so as to constrain said one member and pedal to rock together and so as to support the members in a position extending transversely of the pedal and so that the outer end of one of them can rest against the floor of an automobile at a location spaced laterally from the accelerator pedal thereof and can float slightly relative to the floor in the plane of the floor, an an auxiliary pedal carried by, and at the outer end of, the other of said members and having a foot engageable face positioned to be engaged and pressed flatwise for rocking the said members together in said one direction, said shoulder and inner end of the screw being positioned relative to each other circumferentially of the passage so that the inner end of the screw engages said shoulder in offset relation to the bisector of the shoulder when the accelerator pedal is in normal undepressed rotated position about its axis and the auxiliary pedal is in a rotated position such that it can be depressed and thereby rotate the members sufficiently to fully depress the accelerator pedal from the normal undepressed position of the foot accelerator pedal.

2. An auxiliary foot accelerator in accordance with claim 1 characterized in that said tubular member has, in addition to said threaded opening, at least one additional threaded opening which is a duplicate of said threaded opening and which is spaced endwise of the tubular member from said threaded opening and has its axis substantially parallel to the axis of said threaded opening.

3. An auxiliary foot accelerator in accordance with claim 1 characterized in that said extension member is a rod or polygonal cross section and one of its flat faces provides the said shoulder, the clamping means is on the tubular member, and the auxiliary pedal is on the extension member.

4. An auxiliary foot accelerator in accordance with claim 3 characterized in that said tubular member has a portion adjacent the clamping means which is more readily bendable transversely of the axis of the tubular member than any other portion of the tubular member.

5. An auxiliary foot accelerator according to claim 3 characterized in that the extension member is a rod of square cross section, and that the tubular member has, near one end a portion which is flattened transversely of the axis of the member and provides a part of the clamping means.

CARL A. EVERSMAN.

References Cited in the file of this patent

UNITED STATES PATENTS

| Number | Name | Date |
|---|---|---|
| 681,390 | Elwell | Aug. 27, 1901 |
| 1,057,127 | Dodge | Mar. 25, 1913 |
| 1,595,467 | Hart | Aug. 10, 1926 |
| 2,071,013 | Ajdukovich | Feb. 16, 1937 |
| 2,078,324 | Griffiths | Apr. 27, 1937 |
| 2,174,419 | Holtzclaw | Sept. 26, 1939 |
| 2,187,068 | Adamic | Jan. 16, 1940 |
| 2,226,569 | Martin | Dec. 31, 1940 |
| 2,295,792 | Jandus | Sept. 15, 1942 |
| 2,302,436 | Felton | Nov. 17, 1942 |
| 2,524,486 | Snow | Oct. 3, 1950 |
| 2,526,700 | Curtenius | July 31, 1951 |